United States Patent
Selinger et al.

(10) Patent No.: US 10,373,458 B2
(45) Date of Patent: Aug. 6, 2019

(54) AUTOMATIC THREAT DETECTION BASED ON VIDEO FRAME DELTA INFORMATION IN COMPRESSED VIDEO STREAMS

(71) Applicant: Deep Sentinel Corp., Pleasanton, CA (US)

(72) Inventors: David Lee Selinger, Pleasanton, CA (US); Ching-Wa Yip, Hong Kong (CH); Chaoying Chen, Taiwan (CH)

(*) Notice: Subject to any disclaimer, the term of this patent is extended or adjusted under 35 U.S.C. 154(b) by 194 days.

(21) Appl. No.: 15/492,011

(22) Filed: Apr. 20, 2017

(65) Prior Publication Data
US 2018/0308330 A1    Oct. 25, 2018

(51) Int. Cl.
| | |
|---|---|
| G06K 9/00 | (2006.01) |
| H04N 7/18 | (2006.01) |
| H04N 5/232 | (2006.01) |
| H04N 21/218 | (2011.01) |
| H04N 21/234 | (2011.01) |
| B60R 25/10 | (2013.01) |
| G08B 13/196 | (2006.01) |

(52) U.S. Cl.
CPC .... *G08B 13/19602* (2013.01); *B60R 25/1012* (2013.01); *G08B 13/196* (2013.01); *G08B 13/19667* (2013.01); *H04N 7/18* (2013.01); *H04N 7/181* (2013.01); *H04N 21/21805* (2013.01); *G06K 9/00771* (2013.01)

(58) Field of Classification Search
CPC ..... G06K 9/00771; G06K 2009/00738; H04N 7/18; H04N 7/188; H04N 5/232; H04N 21/21805; H04N 21/23418; B60R 2300/102; B60R 25/1012; B60R 2300/8073; G08B 13/196; G01D 5/39
See application file for complete search history.

(56) References Cited

U.S. PATENT DOCUMENTS

| | | | |
|---|---|---|---|
| 9,948,902 B1* | 4/2018 | Trundle | H04N 7/183 |
| 2010/0046796 A1* | 2/2010 | Pietquin | G06K 9/00335 |
| | | | 382/103 |
| 2010/0063419 A1* | 3/2010 | Mostafavi | A61B 5/1135 |
| | | | 600/587 |
| 2011/0302236 A1* | 12/2011 | Shrum, Jr. | H04N 21/2343 |
| | | | 709/203 |

(Continued)

*Primary Examiner* — Ricky Chin
(74) *Attorney, Agent, or Firm* — Ellenoff Grossman & Schole LLP; James M. Smedley, Esq.

(57) ABSTRACT

Apparatus and associated methods relate to identifying objects of interest and detecting motion to automatically detect a security threat as a function of video frame delta information received from a video encoder. In an illustrative example, the video encoder may be an H.264 encoder onboard a video camera. A cloud server may receive the video frame delta information in a compressed video stream from the camera. Threats may be detected by the cloud server processing the video frame delta information in the compressed video stream, without decompression, to identify objects and detect motion. The cloud server may employ artificial intelligence techniques to enhance threat detection by the cloud server. Various examples may advantageously provide increased capacity of a computer tasked with detecting security breaches, due to the significant reduction in the amount of data to be processed, relative to threat detection based on processing uncompressed video streams.

3 Claims, 4 Drawing Sheets

(56) References Cited

U.S. PATENT DOCUMENTS

| | | | |
|---|---|---|---|
| 2012/0026308 A1* | 2/2012 | Johnson | G06K 9/00369 348/77 |
| 2012/0133774 A1* | 5/2012 | Sarhan | G08B 13/19645 348/159 |
| 2014/0152817 A1* | 6/2014 | Lee | H04N 7/18 348/143 |
| 2018/0048850 A1* | 2/2018 | Bostick | H04N 5/77 |

* cited by examiner

AUTOMATIC THREAT DETECTION BASED ON VIDEO FRAME DELTA INFORMATION IN COMPRESSED VIDEO STREAMS

FIELD OF THE INVENTION

Various embodiments relate generally to automatic event detection based on video frame delta information in compressed video streams.

BACKGROUND

Video are generally composed from a series of images presented over time. An image may be presented as units of information known as picture elements. Each picture element may represent an element of an image as data having numeric value. Picture elements may be referred to as pixels. Pixels may represent visible characteristics of an image. Visible characteristics of an image include brightness and color. Many pixels are composed of multiple components representing various visible characteristics. For example, some pixels may contain numeric values representing the intensity levels of more than one color at a specific location in an image. Users of video include individuals, organizations, computer applications, and electronic devices. Some video may be generated by computer applications. Some video may be generated by a device known as a video camera. A video camera may capture a series of optically sensed images and transform the images into a video stream. Many video streams are composed of units of video data known as video frames. Some video frames include an entire image. Many video frames include parts of an image. Video streams may contain many images. The pixels of many images may represent large amounts of data.

A video data stream may be transmitted over a network, stored in a file system, or processed in various ways. For example, some video is processed to reduce the amount of data required to store or transmit the video. Reducing the amount of data in a video may be accomplished through a process known as video compression. Video compression may operate at various levels of a video stream to reduce the amount of data required to store, transmit, or process the video stream. For example, video compression may operate to reduce the data required to represent a single image, by processing regions of an image to eliminate redundant data from the image. Regions of an image to be processed may be known as macroblocks. Each macroblock of an image may be composed of pixels in close proximity to other pixels within the macroblock. Pixels in close proximity to other pixels may share similar characteristics that may make some pixels or macroblocks redundant. Some characteristics that may be similar enough to allow redundant data to be eliminated may include values of color or intensity at the pixel level. Some characteristics that may be similar enough to allow redundant data to be eliminated may include values of quantization parameters or discrete cosine transform (DCT) coefficients at the macroblock level. Eliminating redundant pixels or macroblocks from an image may help reduce the data required to represent the image.

Some video compression processes may reduce the data required to represent a series of images. Video may be compressed by eliminating data redundant in a series of images. For example, a video stream may be compressed by choosing a frame as a reference frame, and eliminating redundant data from a series of subsequent frames. A reference frame in a compressed video stream may be referred to as a key-frame, index frame, or an I-frame. Data redundant in a series of frames or images may be identified as the pixels in each frame that do not change relative to the reference frame. The data that is not redundant may then be identified as the pixels in each frame that change, in value, position, or other characteristic, relative to a prior frame. Pixels that change relative to a prior frame may be referred to as video frame delta information. Many video compression processes encode video frame delta information relative to each successive frame. Frames in a compressed video stream that contain video frame delta information may be referred to as delta frames. Delta frames in a compressed video stream may be B-frames, P-frames, or D-frames. Some compressed video stream delta frames encode only pixels which have changed relative to a delta frame or a key-frame. In many video streams, movement of pixels between frames may be encoded as motion vectors in the video frame delta information.

Video may also be processed to detect whether features or events occur in the video. Image processing techniques including filtering, edge detection, and template matching may be employed to detect or identify an object in a video stream. Image filtering techniques may be used to refine an image to discriminate regions of interest from background noise in an image. Some detection processes may use edge detection methods to refine or sharpen boundaries of a region of interest, increasing the signal to noise ratio to aid in identifying the region. Template matching is used in some systems, to compare a template representative of the structural form of a potential object to the structural form of a region of interest. In some systems, a template matching procedure may result in a better score for an object having a structure similar to the template. When an object is identified as a video feature, it may be of interest to determine if the object is moving. Some systems may determine if and how an object may be moving based on techniques such as optical flow.

Some video systems may be configured to detect events, such as threats. For example, template matching may be used to identify a series of images based on comparisons to templates representative of various threats. Once an object has been identified, and a potential threat is suspected based on a template match, optical flow techniques may be employed to determine if the object is moving toward a protected region. Detecting threats in video streams may require many computationally intensive operations, including operations such as image segmentation, image filtering, edge detection, and template matching. Many video streams contain many images, with large regions of interest representing significant amounts of data to be transmitted and processed by threat detection systems. Due to the large amounts of data that need to be transmitted and processed, detecting threats in video may be slow, and may require prohibitively expensive, specialized processing hardware.

Therefore, there is a need in the art for a system and method for identifying and detecting events in video streams in an efficient and effective manner. Specifically, there is a need in the art for a system and method for identifying and detecting events in compressed video streams in order to obviate the need for processing compressed video into uncompressed formats prior to identifying and detecting such events.

SUMMARY

According to an embodiment of the present invention, systems and associated methods relate to identifying objects of interest and detecting motion to automatically detect a security threat as a function of video frame delta information received from a video encoder. In an illustrative example, the video encoder may be an H.264 encoder onboard a video camera.

In a preferred embodiment, a cloud (or local) server may receive the video frame delta information in a compressed video stream from the camera. Threats may be detected by the cloud server processing the video frame delta information in the compressed video stream, without decompression, to identify objects and detect motion. The cloud server may employ artificial intelligence techniques to enhance event detection by the cloud server. Various examples may advantageously provide increased capacity of a computer tasked with detecting events, such as security breaches, due to the significant reduction in the amount of data to be processed, relative to event detection based on processing uncompressed video streams.

According to an embodiment of the present invention, systems and associated methods relate to identifying objects of interest and detecting motion to automatically detect a security threat as a function of video frame delta information received from a video encoder. In an illustrative example, the video encoder may be an H.264 encoder onboard a video camera. A cloud server may receive the video frame delta information in a compressed video stream from the camera. Events may be detected by the cloud server processing the video frame delta information in the compressed video stream, without decompression, to identify objects and detect motion based on image processing and artificial intelligence techniques. Various examples may advantageously provide increased capacity of a computer tasked with detecting security breaches to process an increased number of compressed video streams, due to the significant reduction in the amount of data to be processed, relative to event detection based on processing uncompressed video streams.

According to an embodiment of the present invention, systems and associated methods relate to identifying objects of interest and detecting motion to automatically detect an event as a function of video frame delta information received from a video encoder. In an illustrative example, the video encoder may be an H.264 encoder onboard a video camera. For instance, a cloud server may configure the video camera with threats to be detected in the form of object templates and predictive models. Events may be detected by the processor onboard the video camera processing the video frame delta information in the compressed video stream. The video camera may employ artificial intelligence techniques to enhance event detection. Various examples may advantageously provide the ability to automatically detect events onboard a camera with reduced processing power and limited memory resources, due to the significant reduction in the amount of data to be processed, relative to event detection based on processing uncompressed video streams.

Various embodiments may achieve one or more advantages. For example, some embodiments may reduce the computational and communication workload of a computer tasked with detecting security breaches. This facilitation may be a result of reducing the amount of data to be processed. In some embodiments, events may be automatically detected by a cloud server processing the compressed video stream from an inexpensive camera having limited computational and communication resources, reducing the camera cost. Such cost reduction may improve the deployment density of event detection systems and lead to an increase in the availability of automatic event detection.

In some embodiments, events may be detected onboard a camera in the compressed video stream. For example, the computational effort required to detect events in the compressed video stream may be reduced to one-tenth the computation to process an uncompressed video stream, enabling a camera with limited resources of memory, processor bandwidth, and power to autonomously detect events. Various examples may increase the number of security cameras manageable by a cloud server. This facilitation may be a result of processing an increased number of compressed video streams, due to the significant reduction in the amount of data to be processed, relative to event detection based on processing uncompressed video streams.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, identifying objects of interest and detecting motion to automatically detect an event as a function of video frame delta information received from a video encoder is briefly introduced with reference to FIG. 1. Second, with reference to FIG. 2, the discussion turns to exemplary embodiments that illustrate a device adapted to compress video and emit frames of a compressed video stream comprising video frame delta information. Specifically, a camera having an imaging subsystem and video encoder is described. Then, with reference to FIG. 3, the discussion turns to exemplary embodiments that illustrate the process flow of an exemplary Event/Threat Detection Engine (TDE). Finally, with reference to FIG. 4, exemplary embodiments are presented that illustrate the process flow of an exemplary Camera Management Engine (CME).

Figure 1:
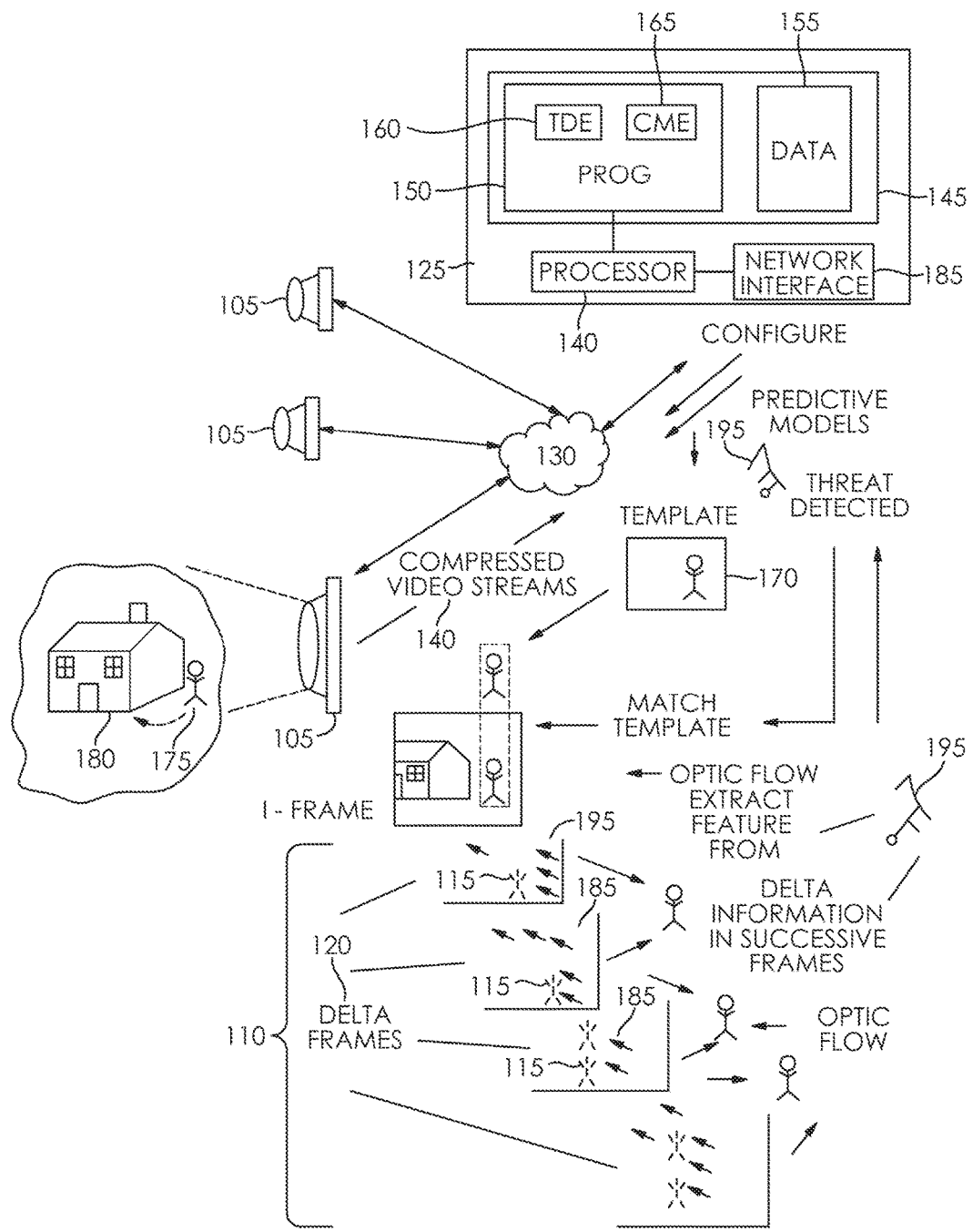
FIG. 1 depicts an activity view of exemplary collaboration network, having a Event/Threat Detection Engine (TDE) and a Camera Management Engine (CME), identifying objects of interest and detecting motion to automatically detect an event as a function of video frame delta information received from a video encoder.

FIG. 1 depicts an activity view of exemplary collaboration network having a Event/Threat Detection Engine (TDE) and a Camera Management Engine (CME), identifying objects of interest and detecting motion to automatically detect an event as a function of video frame delta information received from a video encoder. In FIG. 1, cameras 105 are configured to compress video and emit frames of a compressed video stream 110. The compressed video stream 110 includes video frame delta information 115 in delta frames 120. In some examples, one or more frame of the compressed video stream 110 may be an I-frame. In various designs, one or more delta frame 120 may be a P-frame. In some designs, one or more delta frame 120 may be a B-frame. In some examples, one or more delta frame 120 may be a D-frame.

In some embodiments, the video frame delta information 115 may include pixel delta information. In various designs, the video frame delta information 115 may include discrete cosine transform (DCT) information. In various examples, the video frame delta information 115 may include quantization parameter information. In an illustrative example, the video frame delta information 115 may include motion vector information. The cameras 105 are communicatively coupled to the cloud server 125 through network cloud 130 and network interface 135.

According to an embodiment of the present invention, a (or local networked) cloud server 125 includes a processor 140 communicatively coupled with the network interface 135. The processor 140 is in electrical communication with memory 145. The depicted memory 145 includes program memory 150 and data memory 155. The program memory 150 includes processor-executable program instructions implementing the Event/Threat Detection Engine (TDE) 160 and the Camera Management engine (CME) 165.

In various designs, only the Event/Threat Detection Engine (TDE) 160 may be implemented in processor-executable program instructions in the program memory 150. In some examples, only the Camera Management Engine (CME) 165 may be implemented in processor-executable program instructions in the program memory 150. In an illustrative example, both the Event/Threat Detection Engine (TDE) 160 and the Camera Management engine (CME) 165 may be implemented in processor-executable program instructions in the program memory 150. In various examples, the Event/Threat Detection Engine (TDE) 160 may be implemented as program instructions executable by the processor on board the camera 105, depicted in FIG. 2.

According to an embodiment of the present invention, a Event/Threat Detection Engine (TDE) 160 receives the video frame delta information 115 in compressed video stream 110. The Event/Threat Detection Engine (TDE) 160 extracts features from the video frame delta information 115 in successive delta frames 120. In various embodiments, features may be extracted from the video frame delta information 115 in successive delta frames 120 based on increasing the signal to noise ratio in the video frame delta information 115, applying edge detection techniques to refine the boundaries of potential objects, and performing a template matching operation to identify features and detect threats.

In an illustrative example, increasing the signal to noise ratio in the video frame delta information 115 may include summing the pixel delta information from successive frames, and dividing the summed pixel delta information by the number of summed frames. In various examples, the summed pixel delta information may need to be scaled or converted to facilitate useful summation and division. In some designs, the Camera Management Engine (CME) 165 may configure the camera with a template 170 to be matched to a threat 175 to a protected region 180. In an illustrative example, the threat 175 may be a human form approaching the protected region 180.

In various examples, the Camera Management Engine (CME) 165 may configure the Event/Threat Detection Engine (TDE) 160 with a predictive model to enhance threat detection. In some designs, the protected region 180 may be a home. In some designs, the Event/Threat Detection Engine (TDE) 160 may determine the threat 175 is moving toward the protected region 180 as a function of motion vectors 185 combined from successive delta frames 120. In some embodiments, the Event/Threat Detection Engine (TDE) 160 may determine the threat 175 is moving toward the protected region 180 based on optical flow techniques 190 as a function of the motion vectors 185. In various designs, the Event/Threat Detection Engine (TDE) 160 may notify the Camera Management Engine (CME) 165 when a threat is detected. In some embodiments, the Event/Threat Detection Engine (TDE) 160 may be configured with one or more predictive model 195 calibrated to detect threat objects and motion as a function of the video frame delta information 115.

Figure 2:
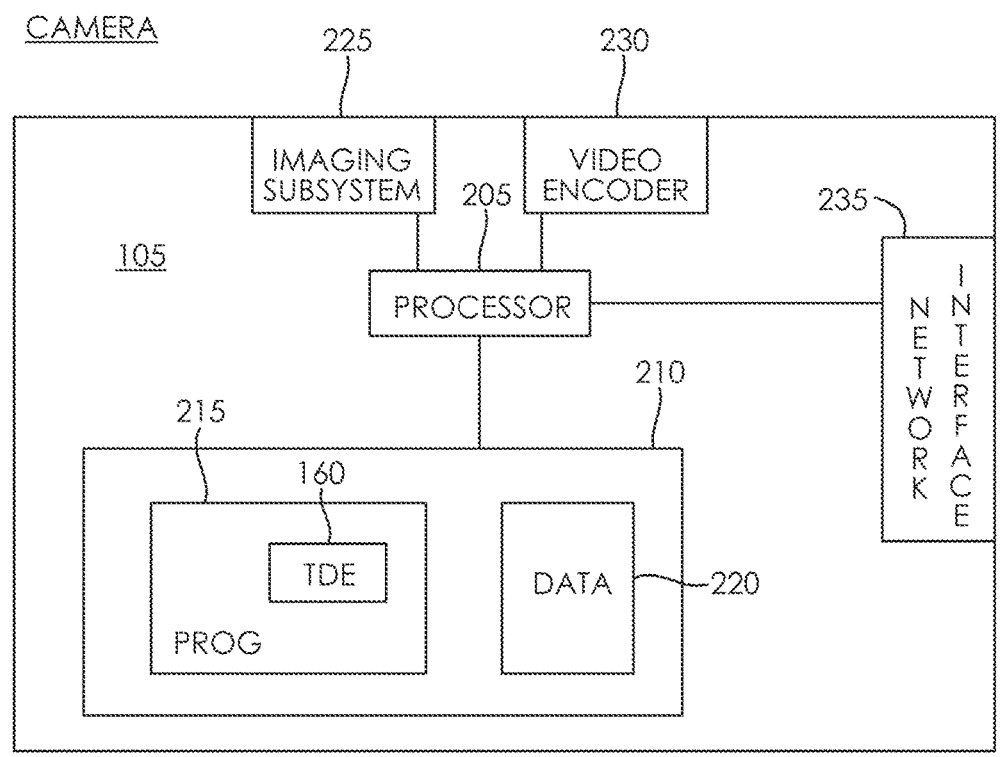
FIG. 2 depicts a structural view of an exemplary camera having a Event/Threat Detection Engine (TDE).

FIG. 2 depicts a structural view of an exemplary camera having a Event/Threat Detection Engine (TDE). In FIG. 2, a block diagram of an exemplary camera 105 includes a processor 205 that is in electrical communication with memory 210. The depicted memory 210 also includes program memory 215 and data memory 220. The program memory 215 includes processor-executable program instructions implementing Event/Threat Detection Engine (TDE) 160. The processor 205 is operatively coupled to imaging subsystem 225 and video encoder 230. In various embodiments, the imaging subsystem 225 may include a high-definition imaging sensor. In some designs, the imaging subsystem 225 may include a night vision imaging sensor. In some embodiments, the video encoder 230 may be an MPEG encoder. In some examples, the video encoder 230 may be an H.264 encoder. The processor 205 is communicatively coupled to network interface 235.

Figure 3:
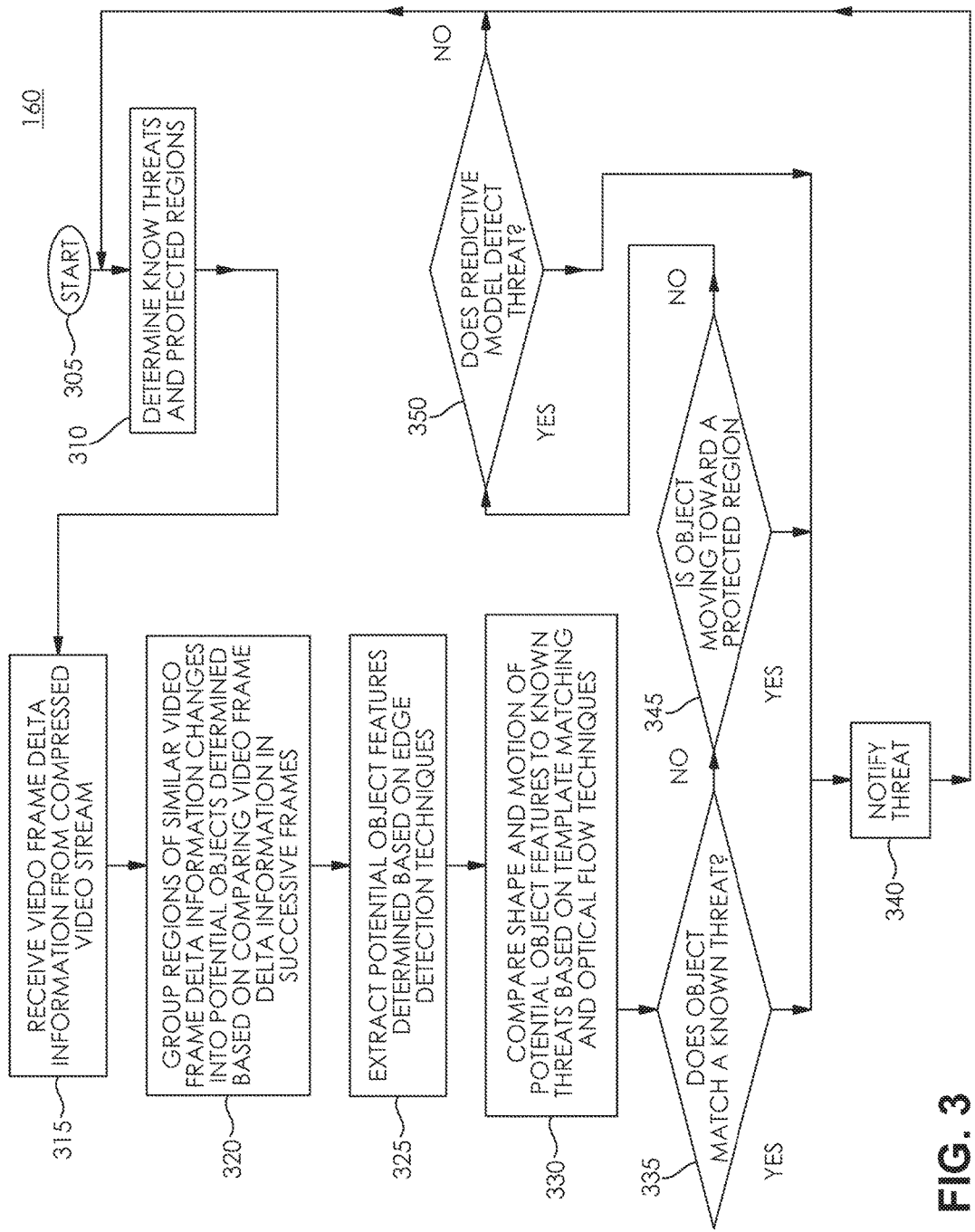
FIG. 3 depicts a process flow of an exemplary Event/Threat Detection Engine (TDE).

FIG. 3 depicts a process flow of an exemplary Event/Threat Detection Engine (TDE). The method depicted in FIG. 3 is given from the perspective of the Event/Threat Detection Engine (TDE) 160 executing as program instructions on processor 205, depicted in FIG. 2. In some embodiments, the Event/Threat Detection Engine (TDE) 160 may execute as a cloud service communicatively coupled to one or more camera 105. The depicted method 305 begins with the processor 205 determining 310 known threats and protected regions. In some embodiments, known threats and protected regions may be configured by a Camera Management Engine (CME) 165.

In various designs, known threats and protected regions may be determined based on historical records of past threats. In an illustrative example, known threats and protected regions may be configured by a user. The method continues with the processor 205 receiving 315 video frame delta information 115 from a compressed video stream 110.

At this point, the method continues with the processor 205 grouping 320 regions of similar video frame delta information 115 into potential objects determined based on comparing video frame delta information 115 in successive delta frames 120. Next, the method continues with the processor 205 extracting 325 potential object features determined based on edge detection techniques.

Then, the method continues with the processor 205 comparing 330 the shape and motion of potential threats based on template matching and optical flow techniques. Next, the method continues with the processor 205 determining 335 if the potential object matches a known threat. Upon a determination the object does match a known threat, the method continues with the processor 205 notifying 340 an entity managing the Event/Threat Detection Engine (TDE) 160 of the threat. In an illustrative example, the entity managing the Event/Threat Detection Engine (TDE) 160 of the threat may be a Camera Management Engine (CME) 165.

Upon a determination the object does not match a known threat, the method continues with the processor 205 determining 345 if the object is moving toward a protected region. Upon a determination the object is moving toward a protected region, the method continues with the processor 205 notifying 340 an entity managing the Event/Threat Detection Engine (TDE) 160 of the threat.

Upon a determination the object is not moving toward a protected region, the method continues with the processor 205 determining if a predictive model configured in the Event/Threat Detection Engine (TDE) 160 has detected the threat. Upon a determination that a predictive model configured in the Event/Threat Detection Engine (TDE) 160 has detected the threat, the method continues with the processor 205 notifying 340 an entity managing the Event/Threat Detection Engine (TDE) 160 of the threat.

Upon a determination that a predictive model configured in the Event/Threat Detection Engine (TDE) 160 has not detected the threat, the method continues with the processor 205 determining 310 known threats and protected regions.

Figure 4:
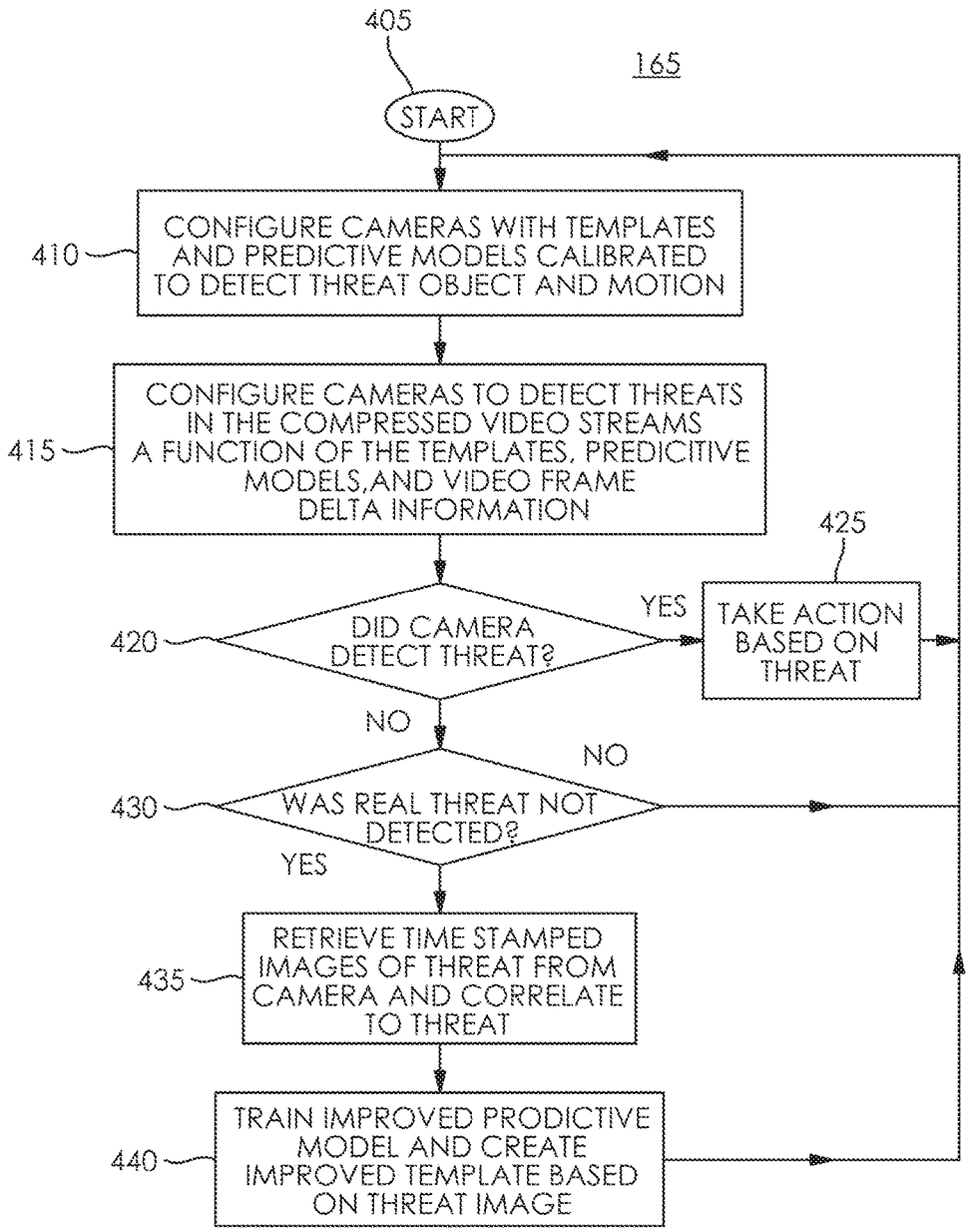
FIG. 4 depicts a process flow of an exemplary Camera Management Engine (CME).

FIG. 4 depicts a process flow of an exemplary Camera Management Engine (CME). The method depicted in FIG. 4 is given from the perspective of the Camera Management Engine (CME) 165 executing as program instructions on processor 140, depicted in FIG. 1. The depicted method 405 begins with the processor 140 configuring 410 cameras 105 with templates 170 and predictive models 195 calibrated to detect threat objects 175 and motion.

Then, the method continues with the processor 140 configuring 415 cameras 105 to detect threat 175 in the compressed video stream 110 as a function of the templates 170, predictive models 195, and the video frame delta information 115.

Next, the method continues 420 with the processor 140 determining 420 if the camera 105 detected threat 175. Upon a determination the camera 105 detected threat 175, the method continues 425 with the processor 140 notifying an entity controlling the Camera Management Engine (CME) 165 to take action based on the threat 175.

Upon a determination the camera 105 did not detect threat 175, the method continues 425 with the processor 140 determining 430 if detection of a real threat 175 was missed. In various embodiments, a determination that a real threat was not detected may be based on ground truth data or post-event information.

Upon a determination a real threat 175 was not detected, the processor 140 retrieves 435 time stamped images of the threat 175 from the camera 105. Then, the method continues with the processor 140 training an improved predictive model 195 and creating an improved template 170 based on timestamped images of the threat 175. Finally, the method continues with the processor 140 configuring 410 cameras 105 with templates 170 and predictive models 195 calibrated to detect threat objects 175 and motion.

Although various embodiments have been described with reference to the Figures, other embodiments are possible. For example, the state of the art in processing digital security cameras follows this process: The camera views a scene; [Optionally] the camera does not send video unless a threshold of pixels have changed over the past "x" seconds (motion detection); the camera compresses the video using a CODEC and sends it along a TCP/IP network to a DVR or client viewer; the client then receives the data; the client uses a CODEC to decompress the data, then reconstruct the full video frame one-at-a-time; the client then can perform analysis of the uncompressed video data.

Preferred embodiments of the disclosed apparatus and methods involve skipping the step of decompressing the data prior to analysis. The system is able to perform significant amounts of analysis on the data in its compressed form. This type of analysis was discovered and initially designed to work with video which has previously been compressed using the "h264" family of CODEC's (x264, h265, etc.). This family of CODEC's/algorithms use a compression methodology by which the information a camera is currently seeing is compared against a "keyframe" and only the pixels which are different from this keyframe are sent over the network. This reduces the amount of network capacity needed by up to 100x—and is a key reason Blu-Ray's are the same size as DVD's but hold much more information. The keyframes are the only frames which sent in their entirety over the network, and even they are significantly compressed. Furthermore because keyframes are sent only every few seconds, a video with 25 fps will be significantly compressed—typically over 90% compressed.

The disclosed apparatus and methods have vast implications because it can increase the capacity of a computer tasked with detecting things like security breaches on security cameras, or people loitering in an area where they don't belong. The uncompressed video, which is analyzed in state-of-the-art video analytics systems, uses incredibly large amounts of memory to perform the analysis and additionally must use vast amounts of processing power to detect these types of events in security video. The approach described here increases the capacity of a traditional computer by approximately 10x, enabling a commodity computer to analyze multiple cameras at once.

By way of example, in a preferred embodiment, the system receives video data from a camera over a traditional TCP/IP network encoded with any of the h264 family of CODEC's. Instead of applying a CODEC to decompress the video, reconstruct the video and then analyze it, the system is configured to analyze each "frame's-delta-information" contained directly within the h264 stream.

Most of the image information is omitted—but all the information that is included in the encoded form are pixels which have changed since the last frame and since the keyframe—these are very similar to the pixels the system uses for motion and video analytics. With a minimum of processing (again about 1/100 what is required to process the entire frame) the system can detect motion, identify "interesting regions" and apply artificial intelligence to recognize patterns in the images.

In a preferred embodiment of the present invention, the system uses real-time encoded h264 type streams to identify security threats for a home. This objective is met by the increasingly commoditized h264-encoding cameras. Embodiments of the present invention fundamentally transform these commoditized cameras into a computationally efficient (meaning that much of this work could actually be done on the camera itself using a low-power computational device) and not computationally-redundant manner.

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect. A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on.

It will be understood that a remote computing device, remote computing system or other computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

What is claimed is:

1. A system to detect an event in compressed video, comprising:
a plurality of surveillance cameras, each of the plurality of surveillance cameras comprising:
a video encoder, configured to compress video and emit frames of a compressed video stream comprising video frame delta information, wherein said video frame delta information excludes redundant data in the form of pixels in each frame that do not change relative to a reference frame and identifies pixels that have changed relative to a prior frame;
a processor, communicatively coupled to the video encoder;
a memory that is not a transitory propagating signal, the memory connected to the processor and encoding computer readable instructions, including processor executable program instructions, the computer readable instructions accessible to the processor, wherein the processor executable program instructions, when executed by the processor, cause the processor to perform operations comprising:
receiving, from the video encoder, a series of video frames comprising video frame delta information; and
identifying objects of interest and detecting motion to detect a security threat as a function of the video frame delta information; and
a cloud server communicatively coupled to the plurality of surveillance cameras, the cloud server comprising:
a second processor, operably coupled to a memory that is not a transitory propagating signal, the memory connected to the second processor and comprising second computer readable instructions, including second processor executable program instructions, the second computer readable instructions accessible to the second processor, wherein the second processor executable program instructions, when executed by the second processor, cause the processor to perform operations comprising:
sending, to at least one surveillance camera, an electronic message comprising a pattern representative of an event to be detected; and
receiving, from the at least one surveillance camera, an electronic message comprising an indication of a detected event based at least in part on said pattern representative of said event,
wherein the cloud server memory further comprises a predictive model adapted to estimate an event probability determined as a function of video frame delta information; the operations performed by the cloud server processor further comprise sending the predictive model to the surveillance camera; and the operations performed by the surveillance camera processor further comprise: receiving the predictive model from the cloud server; estimating an event probability determined as a function of video frame delta information applied as input data to the predictive model; and upon a determination the estimate of the event probability satisfies a predetermined criterion, sending the estimate of the event probability to the cloud server.

2. The system of claim 1, in which the operations performed by the surveillance camera processor to identify objects of interest and detect motion as a function of the video frame delta information further comprise a technique selected from the group consisting of optical flow, edge detection, boundary detection, feature extraction, speeded up robust features, scale-invariant feature transform, and template matching.

3. A system to detect an event in compressed video, comprising:
a plurality of surveillance cameras, each of the plurality of surveillance cameras comprising:
a video encoder, configured to compress video and emit frames of a compressed video stream comprising video frame delta information;
a processor, communicatively coupled to the video encoder;
a memory that is not a transitory propagating signal, the memory connected to the processor and encoding computer readable instructions, including processor executable program instructions, the computer readable instructions accessible to the processor, wherein the processor executable program instructions, when executed by the processor, cause the processor to perform operations comprising:
receiving, from the video encoder, a series of video frames comprising video frame delta information; and
identifying objects of interest and detecting motion to detect a security threat as a function of the video frame delta information; and
a cloud server communicatively coupled to the plurality of surveillance cameras, the cloud server comprising:
a second processor, operably coupled to a memory that is not a transitory propagating signal, the memory connected to the second processor and comprising second computer readable instructions, including second processor executable program instructions, the second computer readable instructions accessible to the second processor, wherein the second processor executable program instructions, when executed by the second processor, cause the processor to perform operations comprising:
sending, to at least one surveillance camera, an electronic message comprising a pattern representative of an event to be detected; and
receiving, from the at least one surveillance camera, an electronic message comprising an indication of a detected event based at least in part on said pattern representative of said event,
wherein the cloud server memory comprises a predictive model adapted to estimate an event probability determined as a function of video frame delta information; the operations performed by the cloud server processor further comprise sending the predictive model to the surveillance camera; and the operations performed by the surveillance camera processor further comprise: receiving the predictive model from the cloud server; estimating an event probability determined as a function of video frame delta information applied as input data to the predictive model; and upon a determination the estimate of the event probability satisfies a predetermined criterion, sending the estimate of the event probability to the cloud server.

* * * * *